(12) United States Patent
Sugahara et al.

(10) Patent No.: US 8,177,881 B2
(45) Date of Patent: May 15, 2012

(54) METHOD FOR EXTRACTING AND SEPARATING RARE EARTH ELEMENTS

(75) Inventors: Hiroto Sugahara, Echizen (JP); Kazuaki Sakaki, Echizen (JP); Takehisa Minowa, Echizen (JP); Hirochika Naganawa, Ibaraki (JP); Kojiro Shimojo, Ibaraki (JP)

(73) Assignees: Shin-Etsu Chemical Co., Ltd., Tokyo (JP); Japan Atomic Energy Agency, Ibaraki (JP)

( * ) Notice: Subject to any disclaimer, the term of this patent is extended or adjusted under 35 U.S.C. 154(b) by 0 days.

(21) Appl. No.: 12/813,698

(22) Filed: Jun. 11, 2010

(65) Prior Publication Data

US 2010/0319491 A1     Dec. 23, 2010

(30) Foreign Application Priority Data

Jun. 17, 2009  (JP) ................................ 2009-144426
Jun. 17, 2009  (JP) ................................ 2009-144445
Jun. 17, 2009  (JP) ................................ 2009-144457

(51) Int. Cl.
C22B 3/16      (2006.01)
C22B 59/00     (2006.01)

(52) U.S. Cl. ........................................ 75/723; 423/21.5
(58) Field of Classification Search ................ 423/21.5; 75/721, 722

See application file for complete search history.

(56) References Cited

U.S. PATENT DOCUMENTS 5,338,520 A     8/1994 Leveque et al.

FOREIGN PATENT DOCUMENTS

JP     2007-327085 A     12/2007

OTHER PUBLICATIONS

Machine translation of JP 2007-327085 published Dec. 20, 2007.*
European Search Report dated Oct. 26, 2010, issued in corresponding European Patent Application No. 10251108.6.
Naganawa, Hirochika et al.; "A New 'Green' Extractant of the Diglycol Amic Acid Type for Lanthanides"; Solvent Extraction Research and Development in Japan, vol. 14, 2007, pp. 151-159, XP002597763.
Shimojo, Kojiro et al.; "Extraction Behavior and Separation of Lanthanides with a Diglycol Amic Acid Derivative and a Nitrogen-donor Ligand" Analytical Sciences, vol. 23, Dec. 2007, pp. 1427-1430, XP002597764.

* cited by examiner

*Primary Examiner* — George Wyszomierski
*Assistant Examiner* — Tima M McGuthry Banks
(74) *Attorney, Agent, or Firm* — Westerman, Hattori, Daniels & Adrian, LLP

(57) ABSTRACT

Solvent extraction from an aqueous phase containing first and second rare earth elements is carried out by contacting an organic phase containing a diglycolamic acid as an extractant and a hydrocarbon or a low-polar alcohol as a solvent, with the aqueous phase below pH 3 for extracting the first rare earth element into the organic phase, back-extracting from the organic phase with an aqueous acid solution for recovering the first rare earth element, and recovering the second rare earth element which has not been extracted into the organic phase and has remained in the aqueous phase.

18 Claims, 2 Drawing Sheets

METHOD FOR EXTRACTING AND SEPARATING RARE EARTH ELEMENTS

CROSS-REFERENCE TO RELATED APPLICATION

This non-provisional application claims priority under 35 U.S.C. §119(a) on Patent Application Nos. 2009-144426, 2009-144445 and 2009-144457 filed in Japan on Jun. 17, 2009, Jun. 17, 2009 and Jun. 17, 2009, respectively, the entire contents of which are hereby incorporated by reference.

TECHNICAL FIELD

This invention relates to a method for extracting and separating rare earth elements, specifically at least two of light rare earth elements La, Ce, Pr, Nd, Sm, and Eu, or at least one of the light rare earth elements and at least one of other rare earth elements inclusive of Y.

BACKGROUND ART

Nowadays, rare earth magnets as typified by Nd magnets are widely used in various motors, sensors and other components mounted in hard disk drives, air conditioners, hybrid vehicles, and the like. As to the rare earth elements from which rare earth magnets are manufactured, their resources are found only in limited countries. A resource crisis is exclaimed because it is expected that the demand will exceed the supply in the near future. There is a strong demand for the reuse of magnet powder, debris and scraps associated with the manufacture of rare earth magnets, the recovery by recycling of rare earth elements from municipal wastes, and the research and development of new rare earth mineral deposits.

Rare earth elements for use in rare earth magnets include cerium (Ce), praseodymium (Pr), neodymium (Nd), samarium (Sm), terbium (Tb), dysprosium (Dy), and the like. Known techniques for the separation of these rare earth elements include ion-exchange resins (liquid to solid extraction) and solvent extraction (liquid to liquid extraction). For the purification and separation of rare earth elements in an industrial manner, the solvent extraction technique is often used because consecutive steps enable efficient large volume processing. In the solvent extraction technique, an aqueous phase in the form of an aqueous solution containing a metal element to be separated is contacted with an organic phase containing an extractant for extracting the specific metal element and an organic solvent for diluting the extractant, for thereby extracting the metal element with the extractant. The metal element is separated in this way.

A variety of extractants are used in the art, for example, tributyl phosphate (TBP), carboxylic acid (Versatic acid 10), phosphoric acid esters, phosphonic acid and phosphinic acid compounds. An exemplary phosphoric acid ester is di-2-ethylhexylphosphoric acid (D2EHPA), a typical phosphonic acid compound is 2-ethylhexylphosphoric acid mono-2-ethylhexyl ester (PC-88A by Daihachi Chemical Industry Co., Ltd.), and bis(2,4,4-trimethylpentyl)phosphoric acid (Cyanex 272 by American Cyanamid) is commercially available as a phosphinic acid compound. They are commonly used in the industry.

The separation efficiency of the solvent extraction technique depends on the ability of an extractant, especially its separation factor. The greater the separation factor, the higher becomes the separation efficiency of the solvent extraction technique, which leads to simplification of separation steps and downsizing of the separation system, and eventually to an improvement of the process efficiency and a cost reduction. Inversely, if the separation factor is lower, the separation process becomes more complicated and the separation system becomes of larger size.

Of the commercially available extractants, PC-88A which is known to have a high separation factor for rare earth elements has a low separation factor between neighboring elements, for example, a separation factor of less than 2, specifically about 1.4 between neodymium and praseodymium which are believed most difficult to separate among the rare earth elements. The separation factor of this order is not sufficient to facilitate separation between neodymium and praseodymium. To separate them at an acceptable purity, a large size system is necessary and capital-intensive. For the purpose of purifying and separating such rare earth elements, it is desired to have an extractant having a higher separation factor than ever and an extraction/separation method using the same.

One extractant known to have a high separation factor for rare earth elements, especially light rare earth elements: lanthanum (La), cerium (Ce), praseodymium (Pr), neodymium (Nd), and samarium (Sm) is a diglycolamic acid as disclosed in JP-A 2007-327085. Solvent extraction using this extractant makes more efficient the process of extracting and separating rare earth elements, especially light rare earth elements. The process of extracting and separating rare earth elements using this extractant demonstrated better results in an experiment, which was conducted at an extractant (diglycolamic acid) concentration of 0.03 M and a rare earth element concentration of 0.1 mM. The latter concentration corresponds to about 1/1,000 of the rare earth element concentration found in actual rare earth element separation processes. The process cannot comply with the treatment of high concentration aqueous rare earth solutions. Using the extractant in a concentration which is 100 to 1,000 times the rare earth concentration is not industrially acceptable because the extraction/separation process must deal with a large solution volume which requires a larger size of separation system and hence an increased expense. Although the process of extracting and separating rare earth elements using the diglycolamic acid demonstrated better results in an experiment, various conditions under which extraction may be practically effected with this extractant in the industry have not yet been determined because this extractant differs in chemical properties from the commercially available extractants, D2EHPA, PC-88A and Cyanex 272.

CITATION LIST

Patent Document 1: JP-A 2007-327085

DISCLOSURE OF INVENTION

An object of the invention is to provide a method for extracting and separating rare earth elements which has overcome the above-discussed problem, and specifically a method for extracting and separating rare earth elements which enables more effective extraction and separation between neighboring rare earth elements, for example, between neodymium and praseodymium, than the prior art method.

The inventors have found that the step of solvent extraction effected by contacting an organic phase containing a diglycolamic acid as an extractant with an aqueous phase containing rare earth elements in a counter-current flow multistage mixer-settler is endowed with an ability to achieve separation between neighboring light rare earth elements, for example, between neodymium and praseodymium when a concentration $C_O$ of the diglycolamic acid extractant in the organic phase and a concentration $C_A$ of rare earth elements in the aqueous phase are controlled such that a ratio of $C_O$ to $C_A$ is in the range: $2 \leq C_O/C_A \leq 10$. This method is effective for selectively separating a specific rare earth element from a mixture of rare earth elements.

The inventors have also found that the step of solvent extraction effected by contacting an organic phase containing a diglycolamic acid as an extractant and a low-polar alcohol as a solvent with an aqueous phase containing rare earth elements in a counter-current flow multistage mixer-settler is able to achieve separation between neighboring light rare earth elements, for example, between neodymium and praseodymium. This method is effective for selectively separating a specific rare earth element from a mixture of rare earth elements.

The inventors have further found that a method for extracting and separating rare earth elements comprising the steps of contacting an organic phase containing a diglycolamic acid as an extractant with an aqueous phase containing rare earth elements in a counter-current flow multistage mixer-settler for extracting a specific rare earth element into the organic phase, back-extracting the organic phase with an aqueous acid solution for selectively separating the specific rare earth element, and washing the organic phase from which the specific rare earth element has been separated is able to achieve separation between neighboring light rare earth elements, for example, between neodymium and praseodymium. This method is effective for selectively separating a specific rare earth element from a mixture of rare earth elements.

In a first embodiment, the invention provides a method for extracting and separating rare earth elements, comprising the steps of:

contacting an organic phase containing a diglycolamic acid having the general formula (1):

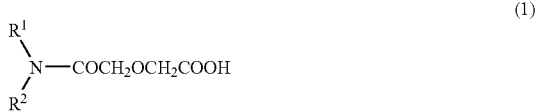

(1)

wherein $R^1$ and $R^2$ are alkyl groups independent of each other, at least one of $R^1$ and $R^2$ is a straight or branched alkyl group of at least 6 carbon atoms as an extractant and an organic solvent with an aqueous phase containing at least first and second rare earth elements under acidic conditions of pH 3 or below, for extracting the first rare earth element into the organic phase, back-extracting from the organic phase with an aqueous acid solution for recovering the first rare earth element once extracted into the organic phase, and recovering the second rare earth element which has not been extracted into the organic phase and has remained in the aqueous phase, wherein provided that $C_O$ is a concentration of the diglycolamic acid extractant in the organic phase and $C_A$ is a concentration of rare earth elements in the aqueous phase, the extraction step is effected under the condition that a ratio of $C_O$ to $C_A$ is $2 \leq C_O/C_A \leq 10$ and $C_O$ is 0.1 mol/L $\leq C_O \leq$ 1.5 mol/L.

In a second embodiment, the invention provides a method for extracting and separating rare earth elements, comprising the steps of:

contacting an organic phase containing a diglycolamic acid having the general formula (1) defined above as an extractant and a low-polar alcohol having the general formula (2):

$C_nH_{2n+1}OH$ (2)

wherein n is an integer of 5 to 8 as a solvent, with an aqueous phase containing at least first and second rare earth elements under acidic conditions of pH 3 or below, for extracting the first rare earth element into the organic phase, back-extracting from the organic phase with an aqueous acid solution for recovering the first rare earth element once extracted into the organic phase, and recovering the second rare earth element which has not been extracted into the organic phase and has remained in the aqueous phase.

In a third embodiment, the invention provides a method for extracting and separating rare earth elements, comprising the steps of:

contacting an organic phase containing a diglycolamic acid having the general formula (1) defined above as an extractant with an aqueous phase containing at least first and second rare earth elements under acidic conditions of pH 3 or below, for extracting the first rare earth element into the organic phase, back-extracting from the organic phase with an aqueous acid solution for recovering the first rare earth element once extracted into the organic phase, and recovering the second rare earth element which has not been extracted into the organic phase and has remained in the aqueous phase, wherein the organic phase resulting from the step of back-extracting from the organic phase with an aqueous acid solution for recovering the rare earth element extracted into the organic phase is washed with water or an aqueous acid solution at pH 3 to 7 and reused in the extraction step.

In the first embodiment, preferably the rare earth concentration $C_A$ in the aqueous phase is 0.01 mol/L $\leq C_A \leq$ 0.7 mol/L.

Preferably in the first, second and third embodiments, the extraction and back-extraction steps are performed in a counter-current flow multistage mixer-settler; and the step of contacting the organic phase with the aqueous phase is at a temperature lower than the flash point of a solvent (organic solvent in the first embodiment or alcohol of formula (2) in the second embodiment) used in the organic phase. Typically, the rare earth elements contained in the aqueous phase are at least two of light rare earth elements La, Ce, Pr, Nd, Sm, and Eu, or at least one of the light rare earth elements and at least one of other rare earth elements inclusive of Y. More specifically, the rare earth elements contained in the aqueous phase are Nd and Pr, and in the extraction step, Nd is extracted into the organic phase while Pr remains in the aqueous phase, whereby Nd and Pr are separated.

In the third embodiment, the rare earth element concentration $C_A$ in the aqueous phase is preferably 0.01 mol/L $\leq C_A \leq$ 0.7 mol/L.

ADVANTAGEOUS EFFECTS OF INVENTION

The method for extracting and separating rare earth elements according to the invention offers a high separation factor, enables a high efficiency of extraction and separation of rare earth elements, especially light rare earth elements, and reduces the initial investment. The method is of great worth in the industry.

BRIEF DESCRIPTION OF DRAWINGS

Like reference characters designate like or corresponding parts throughout the several views.

DESCRIPTION OF EMBODIMENTS

Figure 1:
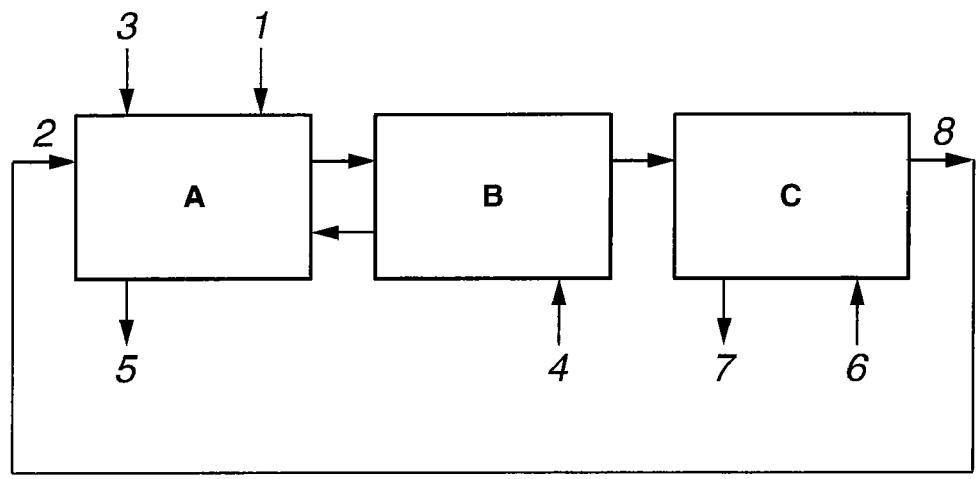
FIG. 1 is a block diagram of one exemplary counter-current flow multistage mixer-settler.

As used herein, the terms "first," "second," and the like do not denote any order or importance, but rather are used to distinguish one element from another.

The extractant used herein is a diglycolamic acid having the general formula (1).

(1)

In formula (1), each of $R^1$ and $R^2$ which may be the same or different is an alkyl group, at least one of $R^1$ and $R^2$ is a straight or branched alkyl group of at least 6 carbon atoms, preferably 6 to 18 carbon atoms, and more preferably 7 to 12 carbon atoms. If both of the alkyl groups have less than 6 carbon atoms, a corresponding compound becomes less lipophilic so that an organic phase containing the same lacks stability and becomes less separable from an aqueous phase, and moreover, the compound itself becomes dissolved in an aqueous phase beyond a negligible level and fails to play the role of extractant. If the alkyl group has too much carbon atoms, a corresponding compound may not be improved in the fundamental functions, i.e., extraction and separation abilities, despite an increased cost of its preparation. As long as one of $R^1$ and $R^2$ is an alkyl group of at least 6 carbon atoms, the other may be an alkyl group of less than 6 carbon atoms if the compound is kept lipophilic. Preferred is the compound having two octyl (—$C_8H_{17}$) groups incorporated, that is, N,N-dioctyl-3-oxapentane-1,5-amic acid or dioctyldiglycolamic acid (also referred to as N,N-dioctyl-3-oxapentane-1,5-amido acid or dioctyldiglycolamic acid and abbreviated as DODGAA, hereinafter).

An ordinary organic phase consists essentially of an extractant and an organic solvent or diluent in which the extractant is dissolvable. The organic solvent is selected from those which have a low solubility in water, an appropriate solubility of the extractant, and a low specific gravity, and help improve an extraction ability, for example, toluene, xylene, hexane, isododecane, kerosene, and higher alcohols.

The organic phase used herein consists essentially of the diglycolamic acid and an organic solvent in which the diglycolamic acid is dissolvable. Using this organic phase, an aqueous solution having a rare earth concentration as found in the industrial process can be treated.

Differently stated, an ordinary organic phase consists essentially of an extractant and a nonpolar solvent. The nonpolar solvent is selected from those which have a low solubility in water, a high solubility of the extractant, and a low specific gravity, and help improve an extraction ability, for example, toluene, xylene, hexane, isododecane, and kerosene. However, toluene, xylene, hexane and analog solvents need careful handling because of high volatility and a flash point below 20° C. On the other hand, isododecane, kerosene and analog solvents which are low volatile and have a flash point above 20° C. have the problem that the flow rates of organic and aqueous phases are limited because phase separation takes a long time when a DODGAA extractant concentration equal to or higher than the minimum DODGAA extractant concentration of 0.4 mol/L necessary to treat an aqueous solution having a rare earth concentration of about 0.2 mol/L as found in the industrial process is used. Thus productivity may not be increased.

In consideration of these problems, the second embodiment of the invention uses an organic phase containing the diglycolamic acid and a solvent which is a low-polar alcohol having the general formula (2):

$$C_nH_{2n+1}OH \qquad (2)$$

wherein n is an integer of 5 to 8. This alcohol may be straight or branched and is liquid at room temperature. Using this alcohol, the organic phase may have an extractant concentration of at least 0.4 mol/L, which enables to treat an aqueous solution having a rare earth concentration of about 0.2 mol/L as found in the industrial process. An alcohol of formula (2) wherein n is less than 5 is unsuitable because it is highly polar and highly hydrated so that it may be dissolved in an aqueous phase during solvent extraction, leading to insufficient separation between organic and aqueous phases, and, in addition, the extractant concentration of the organic phase becomes unstable and difficult to control. The alcohol used herein may be either straight or branched. A straight chain alcohol of formula (2) wherein n is 12 or more is unsuitable because it is solid at room temperature. Even if the alcohol (n≧12) becomes liquid at elevated temperature, the solubility of diglycolamic acid in the alcohol is reduced because of incompatible polarity therebetween, inducing gelation of the liquid. The preferred straight chain alcohols are those of formula (2) wherein n is 5 to 8, namely, 1-pentanol, 1-hexanol, 1-heptanol, and 1-octanol. These alcohols are suitable because of a low solubility in water, a high solubility therein of the diglycolamic acid extractant, a low specific gravity, and a high flash point.

In the first embodiment, a concentration $C_0$ of the extractant in the organic phase is in the range: 0.1 mol/L≦$C_0$≦1.5 mol/L. If $C_0$≦0.1 mol/L, the extractant concentration is too low to treat an aqueous solution having a rare earth concentration as found in the industrial process. Actually, at such a low extractant concentration, only an aqueous solution having a rare earth concentration of up to 0.05 mol/L can be treated, and thus the operation at such a low extractant concentration is inefficient, entailing enlargement of the separation system and an increased cost. Because of the solubility of diglycolamic acid in the solvent (or diluent), it is difficult to provide an extractant concentration $C_0$ of higher than 1.5 mol/L. To attain such a high extractant concentration, a solvent serving as an entrainer and a surfactant such as sodium dioctylsulfosuccinate must be added and as a result, it becomes more complicated to control the treatment conditions so as to ensure stable operation. For efficient extraction and separation, the extractant concentration $C_0$ in the organic phase is preferably in the range 0.2 mol/L≦$C_0$≦1.0 mol/L.

Rare earth elements to be extracted by the extractant are contained in an aqueous phase as an aqueous solution. Rare earth elements may be present in the form of water-soluble salts, for example, chlorides such as $PrCl_3$ and $NdCl_3$.

Of the diglycolamic acids used herein as the extractant, DODGAA is excellent in separation of among light rare earth elements, and separation between light rare earth elements and other rare earth elements. However, DODGAA is inferior in separation of among other rare earth elements, that is, heavy rare earth elements, to the commercially available extractants, D2EHPA, PC-88A and Cyanex 272. In this sense, the rare earth elements in an aqueous phase which are extracted and separated by the inventive method are preferably at least two of light rare earth elements, La, Ce, Pr, Nd, Sm, and Eu, or at least one of the light rare earth elements and at least one of other rare earth elements inclusive of Y. The other rare earth elements include Y, Gd, Tb, Dy, Ho, Er, Tm, Yb, and Lu. In the practice of the invention, a specific rare earth element (also referred to as "first rare earth element") may be extracted into the organic phase. In the case of extraction and separation of Nd and Pr, for example, Nd is preferentially extracted into the organic phase.

In solvent extraction, the extractability of a rare earth element depends on its ionic radius. In many cases, an element having a smaller ionic radius is extracted into the organic phase. Therefore, when two neighboring light rare earth elements are subjected to solvent extraction treatment, for example, either one is preferentially extracted.

| Combination | Element extracted in organic phase |
| --- | --- |
| La/Ce | Ce |
| Ce/Pr | Pr |
| Pr/Nd | Nd |
| Nd/Sm | Sm |
| Sm/Eu | Eu |

In one preferred embodiment, a concentration $C_A$ of rare earth elements in the aqueous phase is in the range $0.01\ \text{mol/L} \leq C_A \leq 0.7\ \text{mol/L}$. If $C_A \leq 0.01$ mol/L, the extraction and separation abilities in the extraction/separation operation are satisfactory. At such a low rare earth element concentration, however, a large volume of aqueous phase must be treated until a sufficient amount of the target rare earth element is recovered. This may lead to enlargement of the separation system and an increased cost. If $C_A > 0.7$ mol/L, it may be difficult to obtain an organic phase having a diglycolamic acid concentration compliant with such a high rare earth element concentration. Consequently, the amount of diglycolamic acid extractant which is available for such a high rare earth element concentration is insufficient, resulting in solidification of the organic phase and a failure of solvent extraction to effect separation and purification.

In the first embodiment, a ratio of the extractant concentration $C_O$ in the organic phase to the rare earth element concentration $C_A$ in the aqueous phase is in the range: $2 \leq C_O/C_A \leq 10$. If $C_O/C_A < 2$, the concentration of diglycolamic acid extractant is insufficient for the rare earth element concentration, resulting in solidification of the organic phase and a failure of solvent extraction to effect separation and purification. A ratio $C_O/C_A$ of higher than 10 does not contribute to improvements in the fundamental functions, i.e., extraction and separation abilities, and a higher organic phase concentration of the extractant relative to an aqueous phase concentration of the rare earth element indicates a cost increase.

During the extraction treatment, the extraction system (combined organic and aqueous phases) is maintained at pH 3 or below. Above pH 3, rare earth elements tend to form hydroxides which precipitate. This becomes an impediment to extraction and separation when the organic phase is contacted with the aqueous phase. This also results in a failure of phase separation, impeding the extraction treatment. In the case of strong acidity, undesirably a base or the like must be used in a larger amount to adjust to an equilibrium acid concentration. Therefore, the extraction system (combined organic and aqueous phases) is preferably adjusted to a pH range from 1 to 3 during the extraction treatment.

During the extraction treatment, the extraction system (combined organic and aqueous phases) is preferably maintained at a temperature equal to or lower than the flash point of the solvent in the organic phase. In general, a higher temperature leads to a higher solubility of the extractant into the organic phase and better separation between organic and aqueous phases. However, to prevent a fire from being taken in excess of the flash point, the temperature should not exceed the flash point of the solvent. Preferably the extraction system is controlled to a temperature lower than the flash point minus a value from 5° C. to 10° C.

Referring to FIG. 1, a counter-current flow multistage mixer-settler is schematically illustrated which is preferably used to effect extraction and separation by effectively contacting the organic phase containing an extractant and a diluent with an aqueous solution containing rare earth elements to be separated. The mixer-settler illustrated in FIG. 1 includes an extracting section A, a scrubbing section B, and a back-extracting section C, each of which may consist of one or multiple stages. Lines 1 to 8 depict input and output flows to and from the mixer-settler. The system feeds a rare earth element solution from line 1, an extractant-containing organic phase from line 2, an aqueous alkaline solution (e.g., aqueous sodium hydroxide solution) from line 3, and an aqueous acid solution (e.g., aqueous hydrochloric acid) from lines 4 and 6. An aqueous phase containing residual rare earth elements (not extracted into the organic phase) is recovered from line 5, and an aqueous solution in which the rare earth element once extracted into the organic phase is back-extracted is recovered from line 7. In extracting section A, the pH of the aqueous phase is adjusted in accordance with the type of rare earth elements so that first and second rare earth elements are separated to the organic and aqueous phases, respectively. In scrubbing section B, the organic phase is washed with an aqueous acid solution capable of selectively stripping only the second rare earth element a small fraction of which is dissolved in the organic phase and which should be left in the aqueous phase. In back-extracting section C, the first rare earth element once extracted into the organic phase is back-extracted into an aqueous acid solution. The organic phase containing the extractant from which the first rare earth element has been back-extracted may be recycled from line 8 to line 2 for reuse.

In extracting section A, aqueous rare earth element solution 1 is contacted with extractant-containing organic phase 2 for extraction. A first rare earth element in rare earth element solution 1 is extracted into organic phase 2 whereas aqueous phase 5 containing a second rare earth element (remaining therein without being extracted into organic phase 2) is discharged and collected from extracting section A. Understandably, aqueous alkaline solution 3 is fed for the purpose of adjusting to an equilibrium acid concentration. The organic phase 2 into which the first rare earth element has been extracted is fed to scrubbing section B where organic phase 2 is washed with aqueous acid solution 4 whose pH is adjusted so as to selectively extract only the second rare earth element a small fraction of which is dissolved in the organic phase and which is to be left in the aqueous phase (e.g., in the case of extraction and separation of Nd/Pr, aqueous acid solution 4 is adjusted to pH 1 or 2 so that Pr may be selectively separated). The aqueous acid solution 4, into which only the second rare earth element ought to be left in the aqueous phase has been selectively back-extracted, is fed back to extracting section A, whereas the washed organic phase 2 is fed to back-extracting section C where the first rare earth element in organic phase 2 is back-extracted with aqueous acid solution 6 adjusted to the desired pH. The resultant first rare earth element-containing aqueous solution 7 is discharged and collected. The organic solution 8 (organic phase 2) from which the first rare earth element has been back-extracted may be recycled to extracting section A.

In the embodiment wherein the organic phase contains a diglycolamic acid as the extractant, a problem may arise when the organic phase from which the first rare earth element has been back-extracted into the acid aqueous solution is directly recycled. If such recycling is continued, then the acid remaining in the organic phase functions to reduce the pH of the aqueous phase with which it contacts in the extracting section or the acid is extracted with the extractant into the organic phase. In either case, the extraction of the first rare earth element in the extracting section is impeded, resulting in a failure of stable extraction and separation. This may raise a problem to the counter-current flow multistage mixer-settler adapted to circulate the organic phase.

The method may be modified so as to attain more effective utilization of the organic phase by circulation. Specifically, a washing section of washing the organic phase outflowing from the back-extracting section with water or an aqueous acid solution at pH 3 to less than pH 7 is provided as the pre-stage before the organic phase is fed back to the extracting section. If the organic phase following the back-extraction is washed with water or an aqueous acid solution at pH 3 to less than pH 7, then the acid remaining in the organic phase may be washed away or the acid extracted by the extractant into the organic phase may be released. Then a variation of pH in the extracting section after feedback is minimized and the extraction of the first rare earth element is not impeded, ensuring effective extraction and separation.

Figure 2:
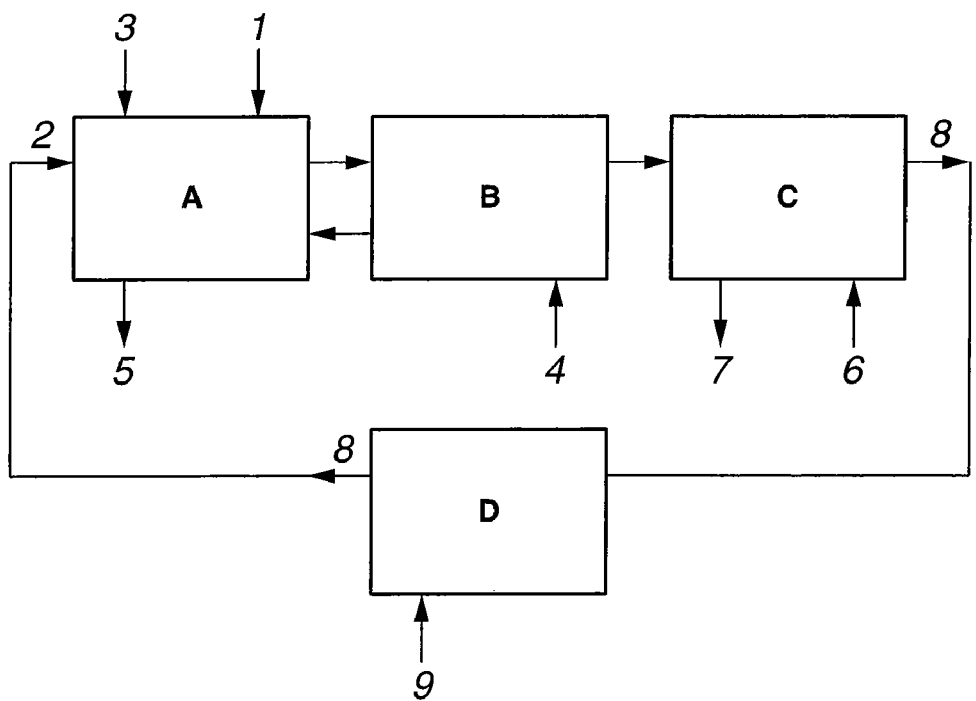
FIG. 2 is a block diagram of another exemplary counter-current flow multistage mixer-settler.

FIG. 2 illustrates another exemplary counter-current flow multistage mixer-settler which may operate in the modified mode. In FIG. 2, reference characters A, B, C, 1 to 8 designate like parts in FIG. 1, and extraction and back-extraction operations are performed in the same manner.

The counter-current flow multistage mixer-settler in FIG. 2 is the same as in FIG. 1 except that a washing section D is added. The organic phase 8 from which the first rare earth element has been back-extracted and which is discharged from back-extracting section C is fed to washing section D where it is washed with water or aqueous acid solution 9. After washing, organic phase 8 is fed back to extracting section A for circulation and reuse.

The water or aqueous acid solution at pH 3 to less than pH 7 used in washing section D may be reused as the aqueous acid solution in scrubbing section B, after pH adjustment if necessary.

The wash liquid used in washing section D is water or an aqueous acid solution at pH 3 to less than pH 7. If the wash liquid is below pH 3, the effect of washing away the acid remaining in the organic phase or releasing the acid extracted by the extractant into the organic phase becomes insufficient. If the pH after washing exceeds 7, undesired emulsification may occur after mixing of organic and aqueous phases. To achieve a satisfactory washing effect, the wash liquid used in washing section D is water or an aqueous acid solution at pH 3 to less than pH 7, preferably water or an aqueous acid solution at pH 5 to less than pH 7.

EXAMPLE

Examples of the invention are given below by way of illustration and not by way of limitation. The concentration of rare earth elements in an aqueous solution was measured by an ICP atomic emission spectrometer (ICP-7500, Shimadzu Corp.).

Examples 1-7 and Comparative Examples 1-4

Mutual Separation of Rare Earth Elements

Solvent extraction was performed on a mixture of rare earth elements according to the invention for examining the ability to separate rare earth elements.

DODGAA was dissolved in hexane to form solutions having the concentration shown in Table 1 as the organic phase. Praseodymium chloride and neodymium chloride were dissolved in an aqueous acid solution to form mixed solutions having a rare earth element ratio Pr:Nd of 1:1 on a molar basis and the concentration of Pr+Nd shown in Table 1. A separatory funnel was charged with 100 ml of the organic phase and 100 ml of the aqueous phase, shaken at room temperature (20° C.) for about 20 minutes to effect extraction, and allowed to stand until equilibrium was reached. The organic phase was then separated from the aqueous phase. Next, 100 ml of the organic phase was fed to a separatory funnel together with 100 ml of 5N hydrochloric acid, which was shaken at 20° C. for about 20 minutes to back-extract the rare earth element once extracted into the organic phase into the hydrochloric acid solution. A Nd/Pr separation factor and phase separation were examined.

Comparative Example 5

D2EHPA was dissolved in hexane to form a solution having a concentration of 1 mol/L as the organic phase. Praseodymium chloride and neodymium chloride were dissolved in an aqueous acid solution to form a mixed solution having a Pr:Nd molar ratio of 1:1 and a Pr+Nd concentration of 0.3 mol/L. The subsequent procedure was the same as in Example 1 whereby a Nd/Pr separation factor and phase separation were examined.

Comparative Example 6

PC-88A was dissolved in hexane to form a solution having a concentration of 1 mol/L as the organic phase. Praseodymium chloride and neodymium chloride were dissolved in an aqueous acid solution to form a mixed solution having a Pr:Nd molar ratio of 1:1 and a Pr+Nd concentration of 0.3 mol/L. The subsequent procedure was the same as in Example 1 whereby a Nd/Pr separation factor and phase separation were examined.

The concentration of praseodymium and neodymium in the aqueous phase and the hydrochloric acid solution after back-extraction was measured by the ICP atomic emission spectrometer, with the results shown in Table 1.

Better results were obtained from Examples 1 to 7 where the ratio of the DODGAA concentration $C_O$ to the mixed rare earth element concentration $C_A$ is in the range: $3 \leq C_O/C_A \leq 10$ and the DODGAA concentration $C_O$ is in the range: $0.1 \leq C_O \leq 1.5$. In Comparative Examples 1, 3 and 4 where the ratio of the DODGAA concentration $C_O$ to the mixed rare earth element concentration $C_A$ is $C_O/C_A < 2$, indefinite separation occurred between organic and aqueous phases, that is, phase separation was poor. In Comparative Example 2 where the ratio is $C_O/C_A > 10$, phase separation and separation factor were satisfactory, but the cost of extractant was undesirably high because the extractant concentration in the organic phase was extremely higher than the mixed rare earth element concentration in the aqueous phase.

DODGAA had a Nd/Pr separation factor of 2.5 whereas D2EHPA had a Nd/Pr separation factor of 1.23 and PC-88A had a Nd/Pr separation factor of 1.4 under the same conditions. DODGAA displayed definite Nd/Pr separation, surpassing the prior art extractants.

TABLE 1

Influence of extractant concentration $C_O$ and mixed rare earth element concentration $C_A$

| | Extractant | $C_O$, mol/L | $C_A$, mol/L | $C_O/C_A$ | Separation factor (Nd/Pr) | Phase separation |
|---|---|---|---|---|---|---|
| Example 1 | DODGAA | 0.1 | 0.02 | 5.0 | 2.5 | good |
| Example 2 | DODGAA | 0.3 | 0.05 | 6.0 | 2.5 | good |
| Example 3 | DODGAA | 0.5 | 0.05 | 10.0 | 2.5 | good |
| Example 4 | DODGAA | 0.3 | 0.1 | 3.0 | 2.5 | good |
| Example 5 | DODGAA | 0.5 | 0.1 | 5.0 | 2.5 | good |
| Example 6 | DODGAA | 1.0 | 0.3 | 3.3 | 2.5 | good |
| Example 7 | DODGAA | 1.5 | 0.5 | 3.0 | 2.5 | good |
| Comparative Example 1 | DODGAA | 0.05 | 0.03 | 1.7 | — | not separated |
| Comparative Example 2 | DODGAA | 1.0 | 0.05 | 20.0 | 2.5 | good |
| Comparative Example 3 | DODGAA | 1.5 | 1.0 | 1.5 | — | not separated |
| Comparative Example 4 | DODGAA | 2.0 | 1.2 | 1.7 | — | not separated |
| Comparative Example 5 | D2EHPA | 1.0 | 0.3 | 3.3 | 1.23 | good |
| Comparative Example 6 | PC-88A | 1.0 | 0.3 | 3.3 | 1.4 | good |

Example 8 and Comparative Example 7

Solvent extraction was performed on a mixture of rare earth elements according to the invention using DODGAA. In the test, a separation factor between light rare earth elements (Nd and Pr) by using DODGAA and a separation factor between heavy rare earth elements (Dy and Tb) by using DODGAA were determined.

DODGAA was dissolved in hexane to form a solution having a concentration of 0.3 mol/L as the organic phase. As to the light rare earth elements, praseodymium and neodymium sources were dissolved in an aqueous acid solution to form a mixed solution having a Pr:Nd molar ratio of 1:1 and a Pr+Nd concentration of 0.1 mol/L as the aqueous phase. As to the heavy rare earth elements, terbium and dysprosium sources were dissolved in an aqueous acid solution to form a mixed solution having a Tb:Dy molar ratio of 1:1 and a Tb+Dy concentration of 0.1 mol/L as the aqueous phase.

A separatory funnel was charged with 100 ml of the organic phase and 100 ml of the aqueous phase, shaken at room temperature (20° C.) for about 20 minutes to effect extraction, and allowed to stand until equilibrium was reached. The organic phase was then separated from the aqueous phase. Next, 100 ml of the organic phase was fed to a separatory funnel together with 100 ml of 5N hydrochloric acid, which was shaken at room temperature (20° C.) for about 20 minutes to back-extract the rare earth element once extracted into the organic phase into the hydrochloric acid solution. The concentration of praseodymium and neodymium or terbium and dysprosium remaining in the aqueous phase and back-extracted into the hydrochloric acid solution was measured by the ICP atomic emission spectrometer.

In Comparative Example 7, commercially available extractant PC-88A was dissolved in hexane to form a solution having a concentration of 1 mol/L as the organic phase. Separation factors for light rare earth elements (Nd/Pr) and heavy rare earth elements (Dy/Tb) by using PC-88A were examined. The results are shown in Table 2.

TABLE 2

Extractants and separation factors for light rare earth elements (Nd/Pr) and heavy rare earth elements (Dy/Tb)

| | Extractant | Separation factor (Nd/Pr) | Separation factor (Dy/Tb) |
|---|---|---|---|
| Example 8 | DODGAA | 2.5 | 1.3 |
| Comparative Example 7 | PC-88A | 1.4 | 2.1 |

The extractant DODGAA effected a separation factor of 2.5 for light rare earth elements (Nd/Pr) which was superior to the commercial extractant PC-88A effecting a separation factor of 1.4. However, DODGAA effected a separation factor of 1.3 for heavy rare earth elements (Dy/Tb) which was inferior to PC-88A effecting a separation factor of 2.1.

It is evident from these results that the preferred rare earth elements contained in the aqueous phase are at least two of light rare earth elements (La, Ce, Pr, Nd, Sm, Eu), or at least one of the light rare earth elements and at least one of the other rare earth elements inclusive of Y.

Example 9

Mutual Separation of Rare Earth Elements

Solvent extraction was performed on a mixture of rare earth elements according to the invention for examining the ability to separate rare earth elements.

DODGAA was dissolved in 1-hexanol to form a solution having a concentration of 0.3 mol/L as the organic phase. Praseodymium chloride and neodymium chloride were dissolved in an aqueous acid solution to form a mixed solution having a rare earth element ratio Pr:Nd of 1:1 on a molar basis and a Pr+Nd concentration of 0.1 mol/L. A separatory funnel was charged with 100 ml of the organic phase and 100 ml of the aqueous phase, shaken at room temperature (20° C.) for about 20 minutes to effect extraction, and allowed to stand until equilibrium was reached. The organic phase was then separated from the aqueous phase. Next, 100 ml of the organic phase was fed to a separatory funnel together with 100 ml of 5N hydrochloric acid, which was shaken at room temperature (20° C.) for about 20 minutes to back-extract the rare earth element once extracted into the organic phase into the hydrochloric acid solution.

The concentration of praseodymium and neodymium remaining in the aqueous phase and back-extracted into the hydrochloric acid solution was measured by the ICP atomic emission spectrometer, finding [Nd]org=0.028 mol/L, [Nd]aqua=0.022 mol/L, [Pr]org=0.017 mol/L, and [Pr]aqua=0.033 mol/L. The 1-hexanol solution of DODGAA effected a separation factor Nd/Pr of 2.5 as calculated from these data.

Examples 10-14

Organic/Aqueous Phase Separation

Solvent extraction was performed on a mixture of rare earth elements according to the invention for examining the temperature of organic and aqueous phases, and the time taken until organic/aqueous phase separation (phase separation time).

DODGAA was dissolved in 1-hexanol to form a solution having a concentration of 0.3 mol/L as the organic phase. Praseodymium chloride and neodymium chloride were dissolved in an aqueous acid solution to form a mixed solution having a rare earth element ratio Pr:Nd of 1:1 on a molar basis and a Pr+Nd concentration of 0.1 mol/L. A separatory funnel was charged with 100 ml of the organic phase and 100 ml of the aqueous phase, shaken at a selected temperature for about 20 minutes to effect extraction, and allowed to stand until equilibrium was reached. The organic phase was then separated from the aqueous phase. The temperature of combined organic and aqueous phases and the time taken until organic phase/aqueous phase separation (phase separation time) were examined, with the results shown in Table 3. As the temperature of combined organic and aqueous phases is closer to the flash point (about 63° C.) of 1-hexanol, the phase separation time is shorter, indicating a better result.

TABLE 3

Temperature of organic and aqueous phases and phase separation time on use of 1-hexanol as solvent

| | Temperature of combined organic and aqueous phases (° C.) | Phase separation time (sec) |
|---|---|---|
| Example 10 | 20 | 35 |
| Example 11 | 30 | 29 |
| Example 12 | 40 | 18 |
| Example 13 | 50 | 12 |
| Example 14 | 60 | 12 |

Examples 15-18 and Comparative Examples 8-9

Mutual Separation of Rare Earth Elements and Organic/Aqueous Phase Separation Versus Solvents Solvent extraction was performed on a mixture of rare earth elements according to the invention for examining the relationship of solvents to the ability to separate rare earth elements and the time taken until organic phase/aqueous phase separation (phase separation time).

DODGAA was dissolved in various solvents (alcohols) to form solutions having a concentration of 0.3 mol/L as the organic phase. Praseodymium chloride and neodymium chloride were dissolved in an aqueous acid solution to form a mixed solution having a rare earth element ratio Pr:Nd of 1:1 on a molar basis and a Pr+Nd concentration of 0.1 mol/L. A separatory funnel was charged with 100 ml of the organic phase and 100 ml of the aqueous phase, shaken at room temperature (20° C.) for about 20 minutes to effect extraction, and allowed to stand until equilibrium was reached. The organic phase was then separated from the aqueous phase. Next, 100 ml of the organic phase was fed to a separatory funnel together with 100 ml of 5N hydrochloric acid, which was shaken at room temperature (20° C.) for about 20 minutes to back-extract the rare earth element once extracted into the organic phase into the hydrochloric acid solution. The concentration of praseodymium and neodymium remaining in the aqueous phase and back-extracted into the hydrochloric acid solution was measured by the ICP atomic emission spectrometer. The separation factor Nd/Pr and phase separation time are shown in Table 4.

The solutions of DODGAA in 1-pentanol, 1-hexanol, 1-heptanol and 1-octanol had a separation factor Nd/Pr of 2.5. Of alcohols of formula (2): $C_nH_{2n+1}OH$, those alcohols wherein n has a value of 5 to 8 facilitated separation of organic phase/aqueous phase, whereas nonanol (n=9) and decanol (n=10) failed in separation of organic phase/aqueous phase.

TABLE 4

Separation factor and phase separation versus solvent

| | Solvent | Separation factor (Nd/Pr) | Phase separation |
|---|---|---|---|
| Example 15 | 1-pentanol | 2.5 | separated |
| Example 16 | 1-hexanol | 2.5 | separated |
| Example 17 | 1-heptanol | 2.5 | separated |
| Example 18 | 1-octanol | 2.5 | separated |
| Comparative Example 8 | nonanol | — | not separated |
| Comparative Example 9 | decanol | — | not separated |

Example 19

This example used a mixer-settler for extraction as shown in FIG. 1.

DODGAA was dissolved in isododecane to form a solution having a concentration of 0.3 mol/L as the organic phase. Neodymium chloride and praseodymium chloride and were dissolved in an aqueous acid solution to form a mixed solution having a rare earth element ratio Nd:Pr of 1:1 on a molar basis and a Nd+Pr concentration of 0.1 mol/L as the aqueous phase.

The counter-current flow multistage mixer-settler of FIG. 1 included an extracting section A of 24 stages, a scrubbing section B of 24 stages, and a back-extracting section C of 8 stages. The organic phase and the aqueous phase were mixed at room temperature (40° C.) to effect extraction. After the steady state was reached, the rare earth element in the organic phase was back-extracted into an aqueous hydrochloric acid solution. The concentration of neodymium and praseodymium remaining in the aqueous phase and back-extracted into the hydrochloric acid solution was measured by the ICP atomic emission spectrometer. The hydrochloric acid solution of the stripping liquid had a Nd concentration of 0.2 mol/L and a Pr concentration of 0.0002 mol/L after the back-extraction, and the aqueous phase had a Pr concentration of 0.04 mol/L and a Nd concentration of 0.0002 mol/L. The hydrochloric acid solution after the back-extraction had a neodymium purity [Nd/(Nd+Pr)] of 99.9%. The isododecane solution of DODGAA effected a separation factor Nd/Pr of 2.5 as calculated from these data.

In the mixer-settler of FIG. 1, the mixed solution of neodymium chloride and praseodymium chloride was fed at a flow rate of 15 L/h from line 1, the extractant solution, 0.3M DODGAA in isododecane was fed at a flow rate of 6 L/h from line 2, a 4 mol/L aqueous sodium hydroxide solution was fed at a flow rate of 0.75 L/h from line 3, the aqueous phase was recovered at a flow rate of 16.75 L/h from line 5, a 4 mol/L aqueous hydrochloric acid solution was fed at a flow rate of 3 L/h from line 6, and the hydrochloric acid solution containing back-extracted neodymium was recovered at a flow rate of 3 L/h from line 7. The extractant was circulated from line 8 to line 2 for reuse.

Example 20

This example used a mixer-settler for extraction as shown in FIG. 1.

As in Example 9, a solution of 0.3 mol/L DODGAA in 1-hexanol was used as the organic phase, and a mixed solution of neodymium chloride and praseodymium chloride having a Nd:Pr ratio of 1:1 on a molar basis and a Nd+Pr concentration of 0.1 mol/L was used as the aqueous phase.

The counter-current flow multistage mixer-settler of FIG. 1 included an extracting section A of 24 stages, a scrubbing section B of 24 stages, and a back-extracting section C of 8 stages. The organic phase and the aqueous phase were mixed at room temperature (20° C.) to effect extraction. After the steady state was reached, the rare earth element in the organic phase was back-extracted into an aqueous hydrochloric acid solution. The concentration of neodymium and praseodymium remaining in the aqueous phase and back-extracted into the hydrochloric acid solution was measured by the ICP atomic emission spectrometer. The hydrochloric acid solution after the back-extraction had a Nd concentration of 0.2 mol/L and a Pr concentration of 0.0002 mol/L, and the aqueous phase had a Pr concentration of 0.04 mol/L and a Nd concentration of 0.0002 mol/L. The hydrochloric acid solution after the back-extraction had a neodymium purity [Nd/(Nd+Pr)] of 99.9%. The 1-hexanol solution of DODGAA effected a separation factor Nd/Pr of 2.5 as calculated from these data.

In the mixer-settler of FIG. 1, the mixed solution of neodymium chloride and praseodymium chloride was fed at a flow rate of 15 L/h from line 1, the extractant solution, 0.3M DODGAA in 1-hexanol was fed at a flow rate of 6 L/h from line 2, a 4 mol/L aqueous sodium hydroxide solution was fed at a flow rate of 0.75 L/h from line 3, the aqueous phase was recovered at a flow rate of 16.75 L/h from line 5, a 4 mol/L aqueous hydrochloric acid solution was fed at a flow rate of 3 L/h from line 6, and the hydrochloric acid solution containing back-extracted neodymium was recovered at a flow rate of 3 L/h from line 7. The extractant was circulated from line 8 to line 2 for reuse.

Comparative Example 10

A solution of 1 mol/L PC-88A in kerosene was used as the organic phase. A mixed solution of neodymium chloride and praseodymium chloride having a Nd:Pr ratio of 1:1 on a molar basis and a Nd+Pr concentration of 0.1 mol/L was used as the aqueous phase.

The counter-current flow multistage mixer-settler of FIG. 1 included an extracting section A of 72 stages, a scrubbing section B of 72 stages, and a back-extracting section C of 8 stages. The mixer-settler was operated as in Example 19. The concentration of neodymium and praseodymium in the aqueous phase and the hydrochloric acid solution after back-extraction was measured by the ICP atomic emission spectrometer. The hydrochloric acid solution after the back-extraction had a Nd concentration of 0.2 mol/L and a Pr concentration of 0.0002 mol/L, and the aqueous phase had a Pr concentration of 0.04 mol/L and a Nd concentration of 0.0002 mol/L. The hydrochloric acid solution after the back-extraction had a neodymium purity [Nd/(Nd+Pr)] of 99.9%. The kerosene solution of PC-88A effected a separation factor Nd/Pr of 1.4 as calculated from these data.

Notably the solution of extractant PC-88A in kerosene was fed at a flow rate of 6 L/h as in Example 19.

It is evident that use of an extractant effecting a higher separation factor according to the invention is successful in reducing the number of extraction stages necessary to treat the same volume and purity of solution. This suggests a reduction of the initial investment.

By implementing the solvent extraction method, specifically by dissolving DODGAA in a low-polar alcohol in a high concentration, and treating an aqueous mixed rare earth solution of about 0.02 to 0.5 M therewith in a mixer-settler, rare earth elements can be purified and separated at a low cost. Similar results are obtainable when the solvent is a mixture of low-polar alcohols or a mixture of a low-polar alcohol and an alkane.

Example 21 and Comparative Example 11

A solution of 0.3 mol/L DODGAA in isododecane was used as the organic phase. A mixed solution of neodymium chloride and praseodymium chloride having a Nd:Pr ratio of 1:1 on a molar basis and a Nd+Pr concentration of 0.1 mol/L was used as the aqueous phase. Using them, a cyclic test was carried out in a counter-current flow multistage mixer-settler.

The mixer-settler of FIG. 1 or 2 included an extracting section A of 24 stages, a scrubbing section B of 24 stages, and a back-extracting section C of 8 stages. The organic phase and the aqueous phase were mixed to effect extraction at 40° C. below the flash point of isododecane. After the steady state was reached, a 100-ml sample was taken out of the organic phase in the back-extracting section C in each cycle.

Praseodymium chloride and neodymium chloride were dissolved in an aqueous acid solution to form a mixed solution having a rare earth element ratio Pr:Nd of 1:1 on a molar basis and a Pr+Nd concentration of 0.1 mol/L as the aqueous phase. A separatory funnel was charged with 100 ml of the sample (organic phase) and 100 ml of the aqueous phase, shaken at room temperature (20° C.) for about 20 minutes to effect extraction, and allowed to stand until equilibrium was reached. The organic phase was then separated from the aqueous phase. Next, 100 ml of the organic phase was fed to a separatory funnel together with 100 ml of 5N hydrochloric acid, which was shaken at 20° C. for about 20 minutes to back-extract the rare earth element once extracted into the organic phase into the hydrochloric acid solution. The concentrations of praseodymium and neodymium back-extracted into the hydrochloric acid solution were measured by the ICP atomic emission spectrometer. From the initial praseodymium and neodymium concentrations (0.1 mol/L, respectively) and the back-extracted praseodymium and neodymium concentrations, a percent extractability was calculated.

Figure 3:
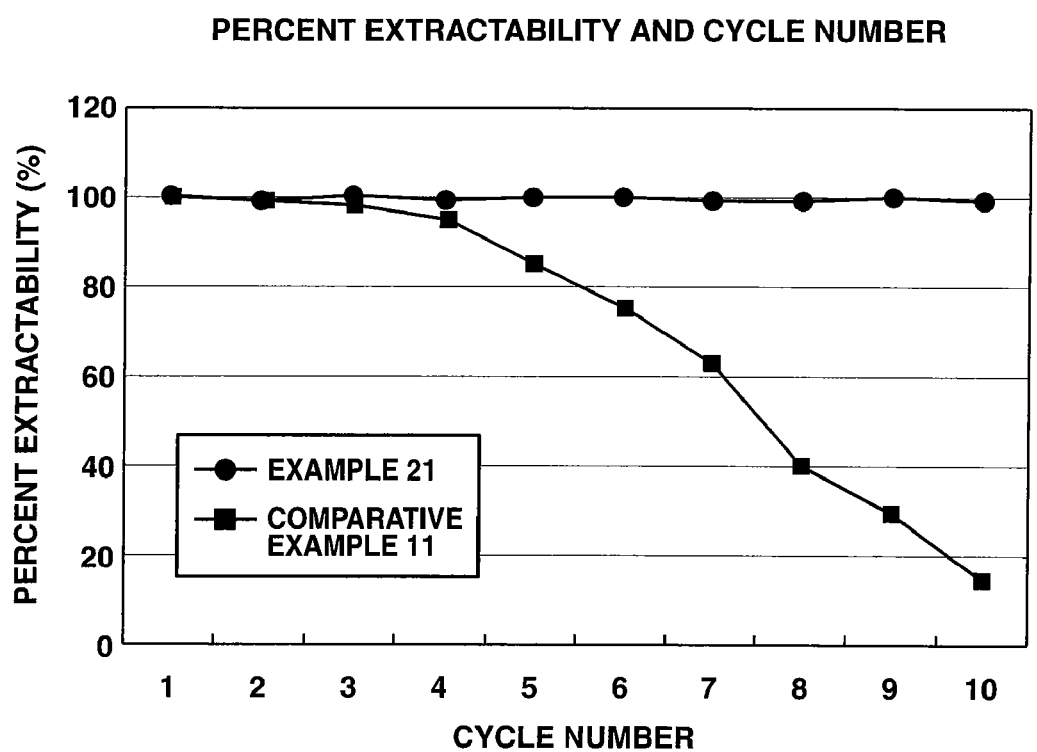
FIG. 3 is a graph showing percent extractability versus number of cycles in Example 21 and Comparative Example 11.

Example 21 is the test in a mixer-settler to which a washing section D for washing the organic phase with deionized water was added as shown in FIG. 2. Comparative Example 11 is the test in a mixer-settler without washing section D as shown in FIG. 1. In the graph of FIG. 3, a percent extractability is plotted relative to cycle number.

In the test where the organic phase was washed with deionized water in washing section D, a satisfactory percent extractability about 100% was maintained even after 10 cycles. In the test without washing section D, the percent extractability showed a noticeable drop after 3 cycles and decreased to 15% after 10 cycles, indicating a failure of extraction.

Japanese Patent Application Nos. 2009-144426, 2009-144445 and 2009-144457 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for extracting and separating rare earth elements, comprising the steps of:
contacting an organic phase containing a diglycolamic acid having the general formula (1):

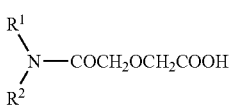

wherein $R^1$ and $R^2$ are alkyl groups independent of each other, at least one of $R^1$ and $R^2$ is a straight or branched alkyl group of at least 6 carbon atoms as an extractant and an organic solvent with an aqueous phase containing at least first and second rare earth elements under acidic conditions of pH 3 or below, for extracting the first rare earth element into the organic phase,
back-extracting from the organic phase with an aqueous acid solution for recovering the first rare earth element once extracted into the organic phase, and
recovering the second rare earth element which has not been extracted into the organic phase and has remained in the aqueous phase, wherein
provided that $C_O$ is a concentration of the diglycolamic acid extractant in the organic phase and $C_A$ is a concentration of rare earth elements in the aqueous phase, the extraction step is effected under the condition that a ratio of $C_O$ to $C_A$ is $2 \leq C_O/C_A \leq 10$ and $C_O$ is 0.1 mol/L $\leq C_O \leq$ 1.5 mol/L.

2. The method of claim 1 wherein $C_A$ is 0.01 mol/L $\leq C_A \leq$ 0.7 mol/L.

3. The method of claim 1 wherein the extraction and back-extraction steps are performed in a counter-current flow multistage mixer-settler.

4. The method of claim 1 wherein the step of contacting the organic phase with the aqueous phase is at a temperature lower than the flash point of a solvent used in the organic phase.

5. The method of claim 1 wherein the rare earth elements contained in the aqueous phase are at least two of light rare earth elements La, Ce, Pr, Nd, Sm, and Eu, or at least one of the light rare earth elements and at least one of other rare earth elements inclusive of Y.

6. The method of claim 1 wherein the rare earth elements contained in the aqueous phase are Nd and Pr, and in the extraction step, Nd is extracted into the organic phase while Pr remains in the aqueous phase, whereby Nd and Pr are separated.

7. A method for extracting and separating rare earth elements, comprising the steps of:
contacting an organic phase containing a diglycolamic acid having the general formula (1):

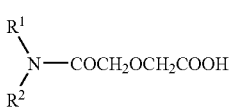

wherein $R^1$ and $R^2$ are alkyl groups independent of each other, at least one of $R^1$ and $R^2$ is a straight or branched alkyl group of at least 6 carbon atoms as an extractant and a low-polar alcohol having the general formula (2):

wherein n is an integer of 5 to 8 as a solvent, with an aqueous phase containing at least first and second rare earth elements under acidic conditions of pH 3 or below, for extracting the first rare earth element into the organic phase,
back-extracting from the organic phase with an aqueous acid solution for recovering the first rare earth element once extracted into the organic phase, and
recovering the second rare earth element which has not been extracted into the organic phase and has remained in the aqueous phase.

8. The method of claim 7 wherein the extraction and back-extraction steps are performed in a counter-current flow multistage mixer-settler.

9. The method of claim 7 wherein the step of contacting the organic phase with the aqueous phase is at a temperature lower than the flash point of the low-polar alcohol used in the organic phase.

10. The method of claim 7 wherein the rare earth elements contained in the aqueous phase are at least two of light rare earth elements La, Ce, Pr, Nd, Sm, and Eu, or at least one of the light rare earth elements and at least one of other rare earth elements inclusive of Y.

11. The method of claim 7 wherein the rare earth elements contained in the aqueous phase are Nd and Pr, and in the extraction step, Nd is extracted into the organic phase while Pr remains in the aqueous phase, whereby Nd and Pr are separated.

12. The method of claim 7 wherein a concentration of rare earth elements in the aqueous phase, $C_A$ is 0.01 mol/L $\leq C_A \leq$ 0.7 mol/L.

13. A method for extracting and separating rare earth elements, comprising the steps of:
contacting an organic phase containing a diglycolamic acid having the general formula (1):

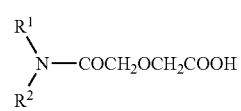

wherein $R^1$ and $R^2$ are alkyl groups independent of each other, at least one of $R^1$ and $R^2$ is a straight or branched alkyl group of at least 6 carbon atoms as an extractant and an organic solvent with an aqueous phase containing at least first and second rare earth elements under acidic conditions of pH 3 or below, for extracting the first rare earth element into the organic phase,
back-extracting from the organic phase with an aqueous acid solution for recovering the first rare earth element once extracted into the organic phase, and
recovering the second rare earth element which has not been extracted into the organic phase and has remained in the aqueous phase, wherein
the organic phase resulting from the step of back-extracting from the organic phase with an aqueous acid solution for recovering the rare earth element once extracted into the organic phase is washed with water or an aqueous acid solution at pH 3 to 7 and reused in the extraction step.

14. The method of claim 13 wherein the extraction and back-extraction steps are performed in a counter-current flow multistage mixer-settler.

15. The method of claim 13 wherein the step of contacting the organic phase with the aqueous phase is at a temperature lower than the flash point of a solvent used in the organic phase.

16. The method of claim 13 wherein the rare earth elements contained in the aqueous phase are at least two of light rare earth elements La, Ce, Pr, Nd, Sm, and Eu, or at least one of the light rare earth elements and at least one of other rare earth elements inclusive of Y.

17. The method of claim 13 wherein the rare earth elements contained in the aqueous phase are Nd and Pr, and in the extraction step, Nd is extracted into the organic phase while Pr remains in the aqueous phase, whereby Nd and Pr are separated.

18. The method of claim 13 wherein a concentration of rare earth elements in the aqueous phase, $C_A$ is 0.01 mol/L$\leq C_A \leq$0.7 mol/L.

* * * * *